US012652318B1

(12) United States Patent (10) Patent No.: US 12,652,318 B1

Choi et al. (45) Date of Patent: Jun. 9, 2026

(54) METHOD FOR IMPLEMENTING ZERO TRUST ROLE-BASED MICROSEGMENTATION BASED ON NETWORK SWITCH AND NETWORK CONTROLLER AND ACCESS SWITCH USING THE SAME

(71) Applicant: PIOLINK, INC., Seoul (KR)

(72) Inventors: Junnyung Choi, Incheon (KR); Nam Pyo Kim, Gwangmyeong-si (KR); Jae Young Park, Anyang-si (KR)

(73) Assignee: PIOLINK, INC., Seoul (KR)

( * ) Notice: Subject to any disclaimer, the term of this patent is extended or adjusted under 35 U.S.C. 154(b) by 0 days.

(21) Appl. No.: 19/375,827

(22) Filed: Oct. 31, 2025

(30) Foreign Application Priority Data

Aug. 25, 2025 (KR) ......................... 10-2025-0118654

(51) Int. Cl.
H04L 9/40 (2022.01)
(52) U.S. Cl.
CPC ............ H04L 63/20 (2013.01); H04L 63/101 (2013.01)
(58) Field of Classification Search
CPC .............................. H04L 63/20; H04L 63/101
See application file for complete search history.

(56) References Cited

U.S. PATENT DOCUMENTS

| | | | |
|---|---|---|---|
| 12,155,768 B2 | 11/2024 | Panicker et al. | |
| 12,177,260 B2 | 12/2024 | Akali et al. | |
| 2012/0233657 A1* | 9/2012 | Guevin | H04L 63/0272 726/1 |
| 2015/0295826 A1* | 10/2015 | Sitharaman | H04L 63/20 370/235 |
| 2019/0132322 A1* | 5/2019 | Song | H04L 63/101 |
| 2022/0029988 A1 | 1/2022 | Levin et al. | |
| 2023/0025586 A1* | 1/2023 | Rolando | H04L 45/586 |
| 2023/0026330 A1* | 1/2023 | Rolando | H04L 63/20 |
| 2023/0026865 A1* | 1/2023 | Rolando | H04L 45/42 |
| 2023/0188505 A1 | 6/2023 | Jensen | |
| 2024/0283826 A1* | 8/2024 | Ganguli | H04L 63/0281 |
| 2024/0356983 A1* | 10/2024 | Akali | H04L 63/0263 |

FOREIGN PATENT DOCUMENTS

| | | |
|---|---|---|
| JP | 7645350 B1 | 3/2025 |
| KR | 102540094 B1 | 6/2023 |
| KR | 102576357 B1 | 9/2023 |
| KR | 102655993 B1 | 4/2024 |

* cited by examiner

*Primary Examiner* — Mohammed Waliullah
(74) *Attorney, Agent, or Firm* — Maschoff Brennan

(57) ABSTRACT

There is provided a method for implementing a zero trust role-based microsegmentation based on a network switch. The method includes steps of: (a) registering, by a network controller, the specific network device in a specific segment among preset segments by referring to asset information corresponding to the specific network device; and (b) transmitting, by the network controller, a specific segment ID corresponding to the specific segment to the access switch, to thereby instruct the access switch to assign the specific segment ID as metadata to a specific MAC address of the specific network device by using VACL, and control an access of the specific network device to the network resources based on at least one specific resource access control rule corresponding to the specific segment ID by using IACL.

20 Claims, 3 Drawing Sheets

Figure 1:
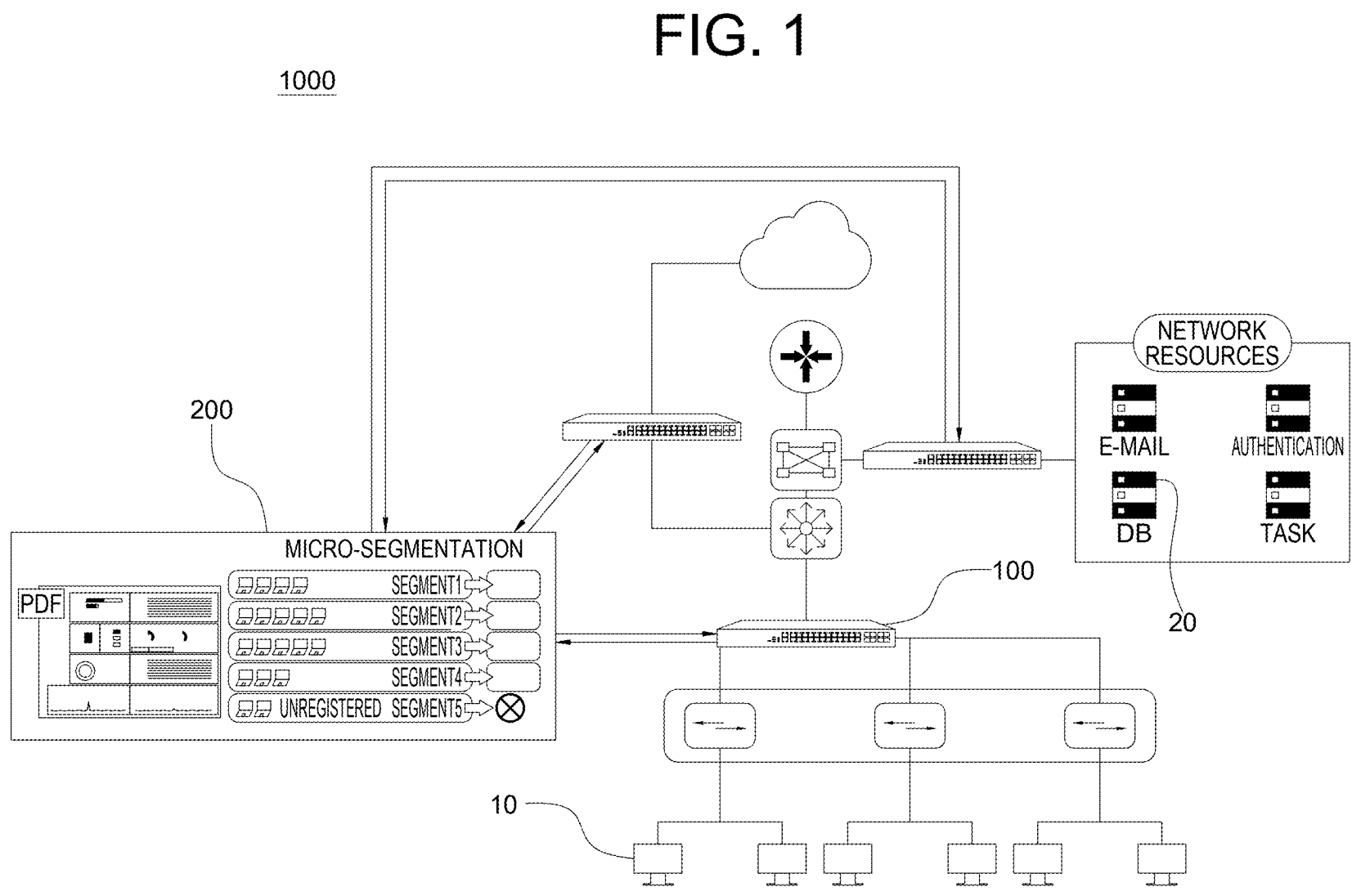

NETWORK RESOURCES

E-MAIL

AUTHENTICATION

DB

TASK

20

100

10

MICRO-SEGMENTATION

200

SEGMENT1
SEGMENT2
SEGMENT3
SEGMENT4
UNREGISTERED SEGMENT5

PDF

METHOD FOR IMPLEMENTING ZERO TRUST ROLE-BASED MICROSEGMENTATION BASED ON NETWORK SWITCH AND NETWORK CONTROLLER AND ACCESS SWITCH USING THE SAME

CROSS REFERENCE TO RELATED APPLICATION

This application claims the benefit of priority to Korean Patent Application No. 10-2025-0118654, filed on Aug. 25, 2025, the entire contents of which being incorporated herein by reference.

FIELD OF THE DISCLOSURE

The present disclosure relates to a method for implementing a zero trust role-based microsegmentation based on a network switch and a network controller and an access switch using the same.

BACKGROUND OF THE DISCLOSURE

A perimeter security model is a powerful network security model that controls an access from an external network to an internal network of a corporate. However, its biggest problem lies in a perimeter itself. A security control is concentrated at the perimeter, and once it crosses the perimeter, the security control can no longer be applied.

In the perimeter security model, granting the access means trusting an accessing subject. That is, because the accessing subject is trusted, the access to an internal resource is granted. For example, a computer located on an internal business network uses an internal IP address, so an internal security device operates on a principle of a trust by default.

An attacker exploits this trust relationship for an attack, seizing a control of an internal terminal already trusted and exploiting it for the attack. Because the perimeter security module only applies the security control at the perimeter, i.e., the point of contact between the external network and the internal network, it cannot detect or block a threat located in the internal network.

That is, the attacker may use malware to infect the computer within the internal network and then use the infected computer as a base to attack information assets. Therefore, the internal network of the corporate, previously a source of trust, is no longer reliable. Thus, it is necessary to assume that the internal network of the corporate has already been infiltrated by the attacker, and a procedure is needed to detect and respond to the attack even in such a worst case scenario.

To address these issues with the perimeter security model, a Zero Trust Security model has been proposed.

The zero trust security fundamentally maintains data and resources inaccessible, with a user granted limited access to those data and resources only under an appropriate circumstance. This is known as a least privilege access.

The zero trust security model assumes that every user, device, or application on the network poses a potential threat and must undergo an authentication before granting the access. That is, the access is granted based on an identity, a device used, and a content requested, rather than based on a location or a network of the user.

Therefore, the zero trust security model offers a superior security by enforcing a device authentication for all access requests, and offers an advantage of allowing the users to access securely from anywhere, enhancing a business flexibility. Furthermore, the zero trust security model continuously monitors a user behavior and a device behavior, thereby allowing a flexible security implementation.

However, implementing the zero trust security model in a system requires a significant time and a significant investment. Furthermore, a requirement to manually authenticate the device for every access request complicates the implementation and increases management costs. Also, a mandatory authentication process degrades a user experience.

Furthermore, a conventional zero trust security architecture operates based on a PDP (Policy Decision Point) or a PEP (Policy Enforcement Point), installs an agent on a client device and controls a resource access through a gateway.

While this conventional approach offers an advantage of a granular control, it faces limitations in installing the agent on all devices. Furthermore, a control at the gateway of the resource front end limits a granular access restriction across the network.

Therefore, the inventor of the present invention proposes a method for more efficiently implementing a zero trust network access.

SUMMARY OF THE DISCLOSURE

It is an object of the present disclosure to solve all the aforementioned problems.

It is another object of the present disclosure to enable a control of a zero trust network access in accordance with a zero trust security based on a network switch.

It is still another object of the present disclosure to enable an application of a granular security policy by using information of MAC/IP/VLAN, etc., without installing an agent on a client terminal.

It is still yet another object of the present disclosure to enable an efficient segment-based resource access control by utilizing an ACL of the network switch.

In accordance with one aspect of the present disclosure, there is provided a method for implementing a zero trust role-based microsegmentation based on a network switch, comprising steps of: (a) in response to acquiring specific network device information for a specific network device from at least one access switch that enables network devices and network resources to communicate with one another within a network, wherein the specific network device accesses the network, registering, by a network controller, the specific network device in a specific segment among preset segments by referring to asset information corresponding to the specific network device, wherein the specific segment corresponds to the asset information, wherein the preset segments are acquired by microsegmenting the network based on a role which the network devices perform according to a network security policy for a zero trust security; and (b) transmitting, by the network controller, a specific segment ID corresponding to the specific segment to the access switch, to thereby instruct the access switch to assign the specific segment ID as metadata to a specific MAC address of the specific network device by using VACL (Vlan Access Control List), and control an access of the specific network device to the network resources based on at least one specific resource access control rule corresponding to the specific segment ID by using IACL (Ingress Access Control list), wherein the specific network device is registered in the specific segment.

As one example, at the step of (a), the network controller identifies at least one matching keyword corresponding to preset segment keywords by referring to attribute values for each of categories registered in the asset information corresponding to the specific network device, identifies the specific segment corresponding to the at least one matching keyword, and registers the specific network device in the specific segment.

As one example, at the step of (a), in a state where at least one segment keyword is set for each of the preset segments by a network manager, the network controller identifies at least one matching keyword which is at least one specific attribute value corresponding to the segment keywords among the attribute values, identifies the specific segment for which the at least one matching keyword is set, and registers the specific network device in the specific segment.

As one example, before the step of (b), in a state where each of segment IDs corresponding to each of the preset segments is set to have at least one specific resource group accessible among resource groups, wherein the resource groups are classified by grouping based on roles of the network resources, the network controller registers an access right of each of the segment IDs for each of the network resources in the IACL by tagging each resource group to which each of the network resources belongs.

As one example, at the step of (b), the network controller instructs the access switch to identify the specific segment ID and a specific destination IP address of the specific packet transmitted from the specific network device, identify an access right of the specific segment ID for a specific network resource corresponding to the specific destination IP address through the IACL, and filter a transmission of the specific packet to the specific network resource according to the identified access right.

In accordance with another aspect of the present disclosure, there is provided a method for implementing a zero trust role-based microsegmentation based on a network switch, comprising steps of: (a) in response to detecting a connection of a specific network device to a network, transmitting, by at least one access switch that enables network devices and network resources to communicate with one another within the network, specific network device information for the specific network device to the network controller, to thereby instruct the network controller to register the specific network device in a specific segment among preset segments by referring to asset information corresponding to the specific network device and transmit a specific segment ID corresponding to the specific segment to the access switch, wherein the specific network device is registered in the specific segment, wherein the specific segment corresponds to specific asset information, wherein the preset segments are acquired by microsegmenting the network based on roles performed by the network devices according to a network security policy for a zero trust security; and (b) in response to acquiring the specific segment ID corresponding to the specific network device from the network controller, assigning, by the access switch, the specific segment ID as metadata to a specific MAC address of the specific network device by using VACL (Vlan Access Control List), and controlling an access of the specific network device to the network resources based on at least one specific resource access control rule corresponding to the specific segment ID by using IACL (Ingress Access Control list).

As one example, at the step of (a), the access switch transmits the specific device information to the network controller, to thereby instruct the network controller to identify at least one matching keyword corresponding to preset segment keywords by referring to attribute values for each of categories registered in the asset information corresponding to the specific network device, identify the specific segment corresponding to the at least one matching keyword, and register the specific network device in the specific segment.

As one example, at the step of (a), in a state where at least one segment keyword is set for each of the preset segments by a network manager, the access switch instructs the network controller to identify at least one matching keyword which is at least one specific attribute value corresponding to the segment keywords among the attribute values, identify the specific segment in which the at least one matching keyword is set, and register the specific network device in the specific segment.

As one example, before the step of (b), in a state where each of segment IDs corresponding to each of the preset segments is set to have at least one specific resource group accessible among resource groups, wherein the resource groups are classified by grouping based on roles of the network resources, the access switch instructs the network controller to register an access right of each of the segment IDs for each of the network resources in the IACL by tagging each resource group to which each of the network resources belongs.

As one example, at the step of (b), the access switch identifies the specific segment ID and a specific destination IP address of a specific packet transmitted from the specific network device, identifies an access right of the specific segment ID for a specific network resource corresponding to the specific destination IP address through the IACL, and filters a transmission of the specific packet to the specific network resource according the identified access right.

In accordance with another aspect of the present disclosure there is provided a network controller for implementing a zero trust role-based microsegmentation based on a network switch, comprising: at least one memory which saves instructions for implementing the zero trust role-based microsegmentation based on the network switch; and at least one processor configured to implement the zero trust role-based microsegmentation based on the network switch according to the instructions saved in the memory to perform processes of: (I) in response to acquiring specific network device information for a specific network device from at least one access switch that enables network devices and network resources to communicate with one another within a network, wherein the specific network device accesses the network, registering the specific network device in a specific segment among preset segments by referring to asset information corresponding to the specific network device, wherein the specific segment corresponds to the asset information, wherein the preset segments are acquired by microsegmenting the network based on a role which the network devices perform according to a network security policy for a zero trust security; and (II) transmitting a specific segment ID corresponding to the specific segment to the access switch, to thereby instruct the access switch to assign the specific segment ID as metadata to a specific MAC address of the specific network device by using VACL (Vlan Access Control List), and control an access of the specific network device to the network resources based on at least one specific resource access control rule corresponding to the specific segment ID by using IACL (Ingress Access Control list), wherein the specific network device is registered in the specific segment.

As one example, at the process of (I), the processor identifies at least one matching keyword corresponding to preset segment keywords by referring to attribute values for each of categories registered in the asset information corresponding to the specific network device, identifies the specific segment corresponding to the at least one matching keyword, and registers the specific network device in the specific segment.

As one example, at the process of (I), in a state where at least one segment keyword is set for each of the preset segments by a network manager, the processor identifies at least one matching keyword which is at least one specific attribute value corresponding to the segment keywords among the attribute values, identifies the specific segment for which the at least one matching keyword is set, and registers the specific network device in the specific segment.

As one example, before the process of (II), in a state where each of segment IDs corresponding to each of the preset segments is set to have at least one specific resource group accessible among resource groups, wherein the resource groups are classified by grouping based on roles of the network resources, the processor registers an access right of each of the segment IDs for each of the network resources in the IACL by tagging each resource group to which each of the network resources belongs.

As one example, at the process of (II), the processor instructs the access switch to identify the specific segment ID and a specific destination IP address of the specific packet transmitted from the specific network device, identify an access right of the specific segment ID for a specific network resource corresponding to the specific destination IP address through the IACL, and filter a transmission of the specific packet to the specific network resource according to the identified access right.

In accordance with another aspect of the present disclosure there is provided an access switch for implementing a zero trust role-based microsegmentation based on a network switch, comprising: at least one memory which saves instructions for implementing the zero trust role-based microsegmentation based on the network switch; and at least one processor configured to implement the zero trust role-based microsegmentation based on the network switch according to the instructions saved in the memory to perform processes of: (I) in response to detecting a connection of a specific network device to a network, transmitting specific network device information for the specific network device to the network controller, to thereby instruct the network controller to register the specific network device in a specific segment among preset segments by referring to asset information corresponding to the specific network device and transmit a specific segment ID corresponding to the specific segment to the access switch, wherein the specific network device is registered in the specific segment, wherein the specific segment corresponds to specific asset information, wherein the preset segments are acquired by microsegmenting the network based on roles performed by network devices according to a network security policy for a zero trust security; and (II) in response to acquiring the specific segment ID corresponding to the specific network device from the network controller, assigning the specific segment ID as metadata to a specific MAC address of the specific network device by using VACL (Vlan Access Control List), and controlling an access of the specific network device to network resources based on at least one specific resource access control rule corresponding to the specific segment ID by using IACL (Ingress Access Control list).

As one example, at the process of (I), the processor transmits the specific device information to the network controller, to thereby instruct the network controller to identify at least one matching keyword corresponding to preset segment keywords by referring to attribute values for each of categories registered in the asset information corresponding to the specific network device, identify the specific segment corresponding to the at least one matching keyword, and register the specific network device in the specific segment.

As one example, at the process of (I), in a state where at least one segment keyword is set for each of the preset segments by a network manager, the processor instructs the network controller to identify at least one matching keyword which is at least one specific attribute value corresponding to the segment keywords among the attribute values, identify the specific segment in which the at least one matching keyword is set, and register the specific network device in the specific segment.

As one example, before the process of (II), in a state where each of segment IDs corresponding to each of the preset segments is set to have at least one specific resource group accessible among resource groups, wherein the resource groups are classified by grouping based on roles of the network resources, the processor instructs the network controller to register an access right of each of the segment IDs for each of the network resources in the IACL by tagging each resource group to which each of the network resources belongs.

As one example, at the process of (II), the processor identifies the specific segment ID and a specific destination IP address of a specific packet transmitted from the specific network device, identifies an access right of the specific segment ID for a specific network resource corresponding to the specific destination IP address through the IACL, and filters a transmission of the specific packet to the specific network resource according the identified access right.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 1 is a drawing schematically illustrating a system for implementing a zero trust role-based microsegmentation based on a network switch in accordance with one example embodiment of the present disclosure.

DETAILED DESCRIPTION OF THE PREFERRED EMBODIMENTS

Figure 2:
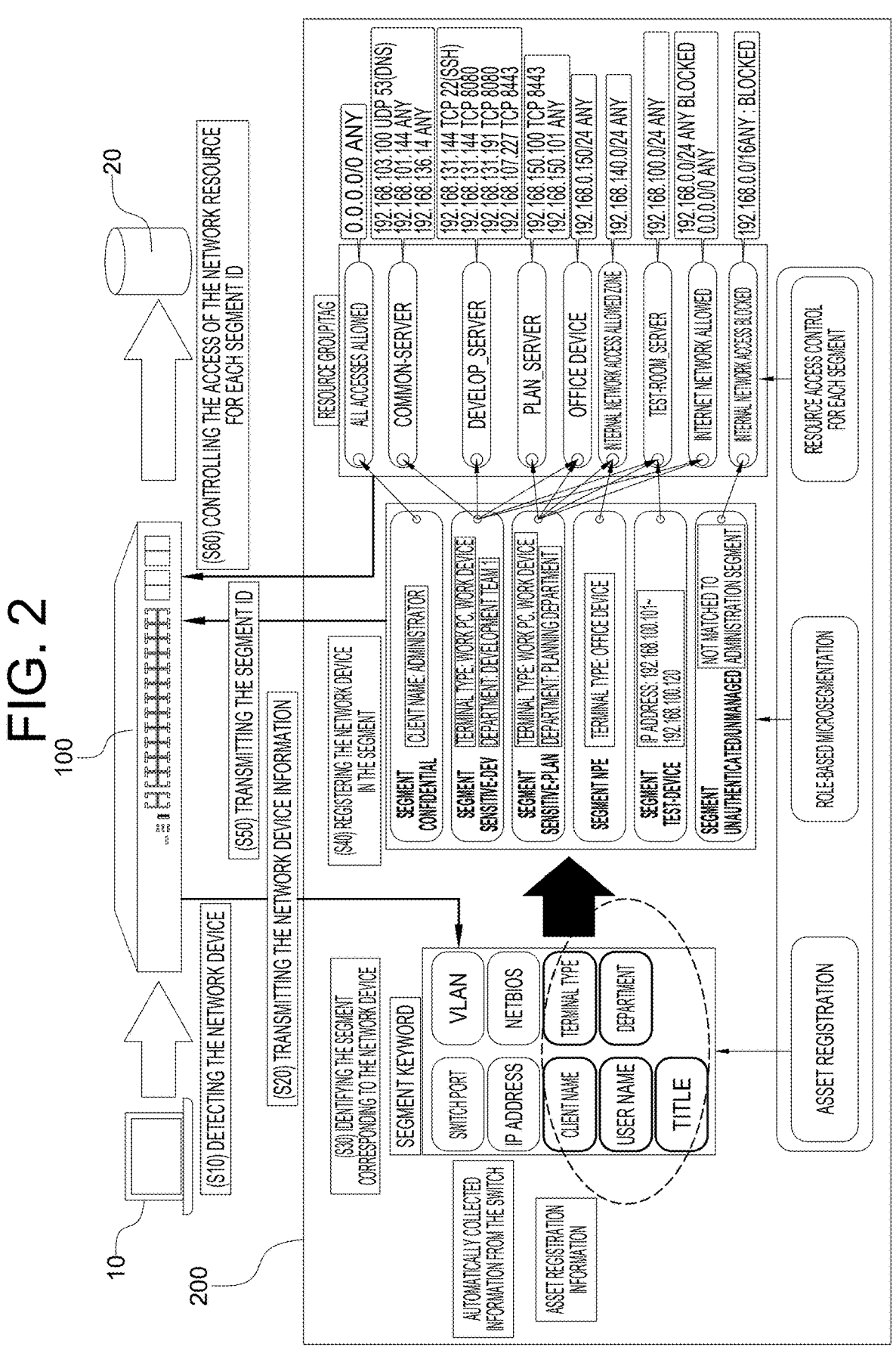
FIG. 2 is a drawing schematically illustrating a state of implementing the zero trust role-based microsegmentation based on the network switch in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating a system for implementing a zero trust role-based microsegmentation based on a network switch in accordance with one example embodiment of the present disclosure. A system 1000 may include at least one access switch 100 and at least one network controller 200. For reference, although FIG. 1 illustrates three access switches, six network devices, and four network resources, the number of the access switches 100, the network devices, and the network resources are not limited thereto, and the system 1000 may actually be configured with a more complex structure.

The access switch 100 that enables the network devices and the network resources to communicate with one another within a network may include the access switch 100, i.e., at least one memory which saves instructions for implementing the zero trust role-based microsegmentation based on the network switch, and at least one processor configured to implement the zero trust role-based microsegmentation based on the network switch according to the instructions saved in the memory.

Specifically, the access switch 100 may typically achieve a desired system performance by using combinations of at least one computing device, e.g., a computer processor, a memory, a storage, an input device, an output device, or any other conventional computing components, an electronic communication device such as a router or a switch, an electronic information storage system such as a network-attached storage (NAS) and a storage area network (SAN), and at least one computer software, e.g., any instructions that allow the computing device to function in a specific way, but the present disclosure is not limited thereto.

Also, the processor of the computing device may include a hardware configuration of MPU (Micro Processing Unit) or CPU (Central Processing Unit), cache memory, data bus, etc. Additionally, any OS (operating system) and software configuration of applications that achieve specific purposes may further be included.

However, it does not exclude the case of the computing device including an integrated processor which is an integrated form of the medium, the processor, and the memory for performing the present disclosure.

Meanwhile, according to the instructions stored in the memory, the processor of the access switch 100 may perform processes of: in response to detecting a connection of a specific network device 10 to the network, transmitting specific network device information for the specific network device 10 to the network controller 200, to thereby instruct the network controller 200 to register the specific network device 10 in a specific segment among preset segments by referring to asset information corresponding to the specific network device 10, and transmit a specific segment ID corresponding to the specific segment to the access switch 100, wherein the specific network device 10 is registered in the specific segment, and wherein the specific segment corresponds to the asset information. Herein, the preset segments may be acquired by microsegmenting the network based on roles performed by network devices according to a network security policy for a zero trust security. Also, according to the instructions stored in the memory, the processor of the access switch 100 may perform processes of: in response to acquiring the specific segment ID corresponding to the specific network device 10 from the network controller 200, assigning the specific segment ID as metadata to a specific MAC address of the specific network device 10 by using a VACL (Vlan Access Control List), and controlling an access of the specific network device 10 to network resources 20 based on at least one specific resource access control rule corresponding to the specific segment ID by using an IACL (Ingress Access Control list).

Also, the network controller 200 managing the at least one access switch 100 that enables the network devices and the network resources to communicate with one another within the network may create the segments by microsegmenting the network based on the roles performed by the network devices 10 according to the network security policy for the zero trust security. The network controller 200 may be a subject that sets each user security policy for the zero trust security for each of the segments, and may include at least one memory which saves instructions for implementing the zero trust role-based microsegmentation based on the network switch, and at least one processor configured to implement the zero trust role-based microsegmentation based on the network switch according to the instructions saved in the memory.

Specifically, the network controller 200 may typically achieve a desired system performance by using combinations of at least one computing device, e.g., a computer processor, a memory, a storage, an input device, an output device, or any other conventional computing components, an electronic communication device such as a router or a switch, an electronic information storage system such as a network-attached storage (NAS) and a storage area network (SAN), and at least one computer software, e.g., any instructions that allow the computing device to function in a specific way, but the present disclosure is not limited thereto.

Also, the processor of the computing device may include a hardware configuration of MPU (Micro Processing Unit) or CPU (Central Processing Unit), cache memory, data bus, etc. Additionally, any OS (operating system) and software configuration of applications that achieve specific purposes may further be included.

However, it does not exclude the case of the computing device including an integrated processor which is an integrated form of the medium, the processor, and the memory for performing the present disclosure.

Meanwhile, according to the instructions stored in the memory, the processor of the network controller 200 may perform process of: in response to acquiring the specific network device information for the specific network device 10 from the at least one access switch 100 that enables the network devices and the network resources to communicate with one another within the network, wherein the specific network device 10 accesses the network, registering the specific network device 10 in the specific segment among the preset segments by referring to the asset information corresponding to the specific network device 10, wherein the specific segment corresponds to the asset information. In addition, according to the instructions stored in the memory, the processor of the network controller 200 may perform processes of: transmitting the specific segment ID corresponding to the specific segment to the access switch 100, to thereby instruct the access switch 100 to assign the specific segment ID as the metadata to the specific MAC address of the specific network device 10 by using the VACL (Vlan Access Control List), and control the access of the specific network device 10 to the network resources 20 based on the at least one specific resource access control rule corresponding to the specific segment ID by using the IACL (Ingress Access Control list), wherein the specific network device 10 is registered in the specific segment.

The method for implementing the zero trust role-based microsegmentation based on the network switch by using the system in accordance with one example embodiment of the present disclosure configured in this manner is described in more detail by referring to FIG. 2 as follows.

First, the access switch 100 may collect MAC (i.e., Media Access Control) addresses, IP (i.e., Internet Protocol) addresses, a VLAN (i.e, Virtual LAN), port information, etc. of the network devices connected to the network. Also, while monitoring an access flow to the network resources of the network devices connected to the network through an sFlow (i.e., sampled Flow), etc., in case the specific network device 10 connecting to the network is detected at a step of S10, the specific network device information including a MAC address, an IP address, VLAN information, etc. of the specific network device 10, i.e., the specific network device information corresponding to the specific network device 10, may be transmitted to the network controller 200 at a step of S20.

Then, the network controller 200 may identify the asset information corresponding to the specific network device 10 by referring to the specific network device information of the specific network device 10 transmitted from the access switch 100, and may register the specific network device 10 in the specific segment among the preset segments by referring to the asset information corresponding to the specific network device 10, wherein the specific segment corresponds to the asset information. Herein, the preset segments may be acquired by microsegmenting the network based on the roles performed by the network devices according to the network security policy for the zero trust security.

That is, the network controller 200 that acquired the specific network device information for the specific network device 10 from the access switch 100 may use the specific network device information, for example, at least one of the MAC address, the IP address, and the VLAN information corresponding to the specific network device 10, to thereby identify the asset information of the specific network device 10, identify at least one matching keyword corresponding to preset segment keywords by referring to attribute values for each of categories registered in the asset information corresponding to the specific network device 10, identify the specific segment corresponding to the at least one matching keyword at a step of S30, and register the specific network device 10 in the specific segment at a step of S40.

Herein, on condition that at least one segment keyword has been set for each of the preset segments by a network administrator, the network controller 200 may identify at least one matching keyword, which is at least one specific attribute value that corresponds to the at least one segment keyword among the attribute values, identify the specific segment in which at least one matching keyword is set, and register the specific network device in the specific segment.

That is, the segment set to correspond to all of the identified matching keywords may be identified as the specific segment corresponding to the specific network device, and the specific network device may be registered to the identified specific segment.

For example, as shown in FIG. 2, the network administrator may create segments such as "Confidential", "Sensitive-Dev", "Sensitive-Plan", "NPE", "Test-Device", and "Unauthenticated/Unmanaged", etc. through role-based microsegmentation, and then set a segment keyword of "Client Name: Administrator" for the "Confidential" segment, set a segment keyword of "Terminal Type: Work PC, Work Device" and a segment keyword of "Department: Development Team 1" for the "Sensitive-Dev" segment, set a segment keyword of "Terminal Type: Work PC, Work Device" and a segment keyword of "Department: Planning Department" for the "Sensitive-Plan" segment, set a segment keyword of "Terminal Type: Office Device" for the "NPE" segment, and set a segment keyword of "IP Address: 192.168.100.101~192.168.100.120" for the "Test-Device" segment.

On condition that each of the segment keywords for each of the segments is set as above, as a result of identifying the specific network information and the asset information of the specific network device 10 whose connection to the network has been detected, it may be confirmed that the segment corresponding to the specific network device 10 is the "confidential" segment in case the attribute value of the "Client name" category in the asset information has the matching keyword of "administrator", it may be confirmed that the segment corresponding to the specific network device 10 is the "Sensitive-Dev" segment in case the attribute value of the "Terminal Type" category in the asset information has the matching keyword of "Work PC" and the attribute value of the "Department" category has the matching keyword of "Development Team 1", and it may be confirmed that the segment corresponding to the specific network device 10 is the "Test-Device" segment in case the attribute value of the "IP Address" category in the specific network device information has the matching keyword of "192.168.100.110". Meanwhile, as a result of identifying the specific network information and the asset information of the specific network device 10, it may be confirmed that the segment corresponding to the specific network device 10 is the "Unauthenticated/Unmanaged" segment in case there are no attribute values corresponding to the segment keywords, i.e., in case there are no matching keywords. Accordingly, the specific network device 10 may be automatically registered to the corresponding specific segment through the matching keywords.

In addition, when identifying the specific segment corresponding to the specific network device according to the segment keyword, a priority may be set for each of the set segments, and by sequentially identifying the segments corresponding to the specific network device in the order of priority, from the highest to the lowest, the specific segment corresponding to the specific network device may be identified.

For example, by referring to FIG. 2, let's assume that "Confidential" is set as a first priority segment, "Sensitive-Dev" as a second priority segment, "Sensitive-Plan" as a third priority segment, "NPE" as a fourth priority segment, "Test-Device" as a fifth priority segment, and "Unauthenticated/Unmanaged" as a sixth priority segment. If all matching keywords of the specific network device 10 are the "Work PC" and the "Planning Department", first, the matching keywords "Work PC" and "Planning Department" may be compared with the segment keyword "administrator" set in the first priority segment "Confidential". Since the matching keywords "Work PC" and "Planning Department" do not correspond to the segment keyword "administrator", it can be determined that the specific network device does not belong to the "Confidential" segment. Next, the matching keywords "Work PC" and "Planning Department" may be compared with the segment keywords "Work PC" and "Development Team 1" set in the second priority segment "Sensitive-Dev". Herein, the matching keyword "Work PC" corresponds to the segment keyword "Work PC", but the other matching keyword "Planning Department" does not correspond to the segment keyword "Development Team 1". Thus, it can be determined that the specific network device does not belong to the "Sensitive-Dev" segment. Next, the matching keywords "Work PC" and "Planning Department" may be compared with the segment keywords "Work PC" and "Planning Department" set in the third priority segment "Sensitive-Plan". Since the matching keyword "Work PC" corresponds to the segment keyword "Work PC" and the matching keyword "Planning Department" also corresponds to the segment keyword "Planning Department," it may be determined that the specific network device belongs to the "Sensitive-Plan" segment. Accordingly, if it is determined that the specific network device belongs to the third priority segment "Sensitive-Plan", without identifying for the fourth to sixth priorities, the specific segment corresponding to the specific network device may be determined to be the "Sensitive-Plan" segment.

Next, the network controller 200 may transmit the specific segment ID corresponding to the specific segment to the access switch 100 at a step of S50, wherein the specific network device 10 is registered in the specific segment.

Then, the access switch 100 may assign the specific segment ID as the metadata to the specific MAC address of the specific network device 10 by using the VACL (Vlan Access Control List), and control the access of the specific network device 10 to the network resources 20 based on the at least one specific resource access control rule corresponding to the specific segment ID by using the IACL (Ingress Access Control list) at a step of S60.

Herein, in a state where each of the segment IDs corresponding to each of the preset segments is set to have at least one specific resource group accessible among resource groups, the network controller 200 may register an access right of each of the segment IDs for each of the network resources in the IACL by tagging each resource group to which each of the network resources belongs. Herein, the resource groups may be classified by grouping based on the roles of the network resources.

For example, as shown in FIG. 2, when the network administrator creates the resource groups such as "All accesses allowed", "Common_Server", and "Office device", etc., and sets the resource groups to which each of the segments may access, the resource group of "Common_Server" for the network resource 20 may be tagged. In this case, since only the "Sensitive_Dev" segment is allowed to access in the "Common_Server" resource group, the access right for the network resource 20 in the IACL, that is, the filter for the network resource 20, may be set such that the segment ID corresponding to the "Sensitive_Dev" segment is allowed to access, while other segment IDs are blocked. In contrast, when the resource group of "Office device" for the network resource 20 is tagged, since only the "Sensitive Dev" segment and the "Sensitive_Plan" segment are allowed to access in the "Office device" resource group, the access right for the network resource 20 may be set such that the segment ID corresponding to the "Sensitive_Dev" segment and the segment ID corresponding to the "Sensitive_Plan" segment are allowed to access, while other segment IDs are blocked. Also, when the "All accesses allowed" resource group is further tagged in addition to the "Office device" resource group for the network resource 20, the access right for the network resource 20 may be set such that, in addition to the segment ID corresponding to the "Sensitive Dev" segment and the segment ID corresponding to the "Sensitive_Plan" segment, the segment ID corresponding to the "Confidential" segment is also allowed to access, while other segment IDs are blocked.

Figure 3:
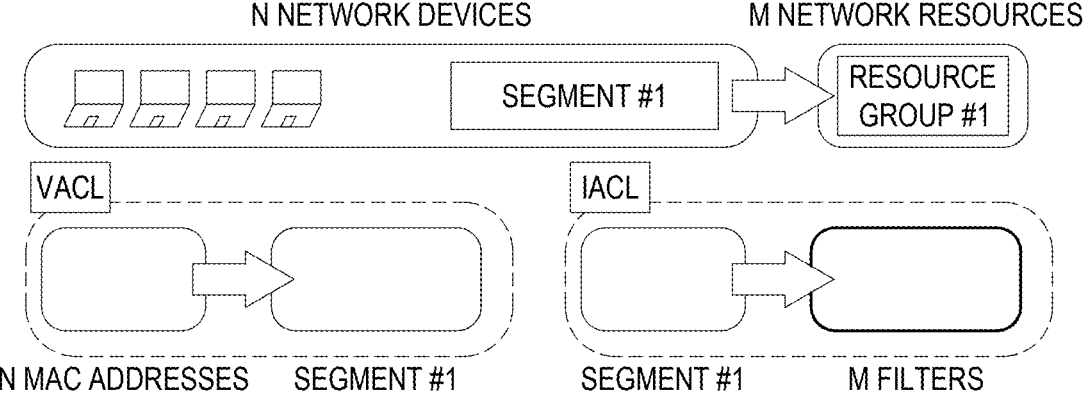
FIG. 3 is a drawing schematically illustrating a state of controlling an access by using a VACL and an IACL in the state of implementing the zero trust role-based microsegmentation based on the network switch in accordance with one example embodiment of the present disclosure.

Meanwhile, by referring to FIG. 3, a process of creating the resource access control rule for one segment using the VACL and the IACL in the access switch 100 is briefly described as follows.

Assuming that the number of network devices registered in segment #1 is N and the number of network resources tagged in resource group #1 is M, the segment #1 may be identically assigned as the metadata for N MAC addresses corresponding to the N network devices using the VACL, and M filters may be set to filter the access to each of the M network resources for the segment #1 using the IACL.

Therefore, the number of the ACL filters in the access switch 100 becomes N+1*M, which can drastically reduce the number of the filters compared to the conventional ACL implementation, where N*M filters are generated by creating the filters for each of the M network resources for each of the N network devices. Also, when a memory capacity of a filter hardware of the access switch is 1k to 2k, the zero-trust network access may be controlled for a plurality of the network resources.

In addition, since a minimum unit of the segment was limited to a switch+port in the past, it was impossible to allocate multiple segments to a single switch port. However, when using the VACL and the IACL as in the present disclosure, it is possible to operate the segments for the network devices anywhere without physical limitations of the conventional switch+port.

That is, the present disclosure operates the segment by specifying the segment ID as the metadata to the MAC address of the network device regardless of the switch port, thereby enabling a segment operation to continue even if a connection location of the network device changes.

In addition, in the past, when the plurality of network devices were connected to the single switch port through a hub or the like, all network devices connected to the single switch port through the hub or the like were managed with the same segment, so each of the network devices using the single switch port through the hub or the like could not be operated with a different segment. However, according to the present disclosure, each of the network devices using the single switch port through the hub or the like may be operated with different segments.

Meanwhile, a process of processing a packet transmitted from the specific network device using the VACL and the ICAL as described above is briefly described as follows.

When the packet including the MAC address, a source IP address, and a destination IP address from the specific network device is transmitted, the access switch forwards the packet by assigning the segment ID as the metadata to the MAC address of the packet through the VACL. Then, the access switch identifies the segment ID and the destination IP address in the forwarded packet. Thereafter, as a result of identifying a filtering condition of the segment ID for the destination IP address through the IACL, if the segment ID is confirmed to be permitted to access the destination IP address, the packet is transmitted to the destination IP address so that the specific network device is able to access the network resource corresponding to the destination IP address, whereas if the segment ID is confirmed to be blocked from accessing the destination IP address, the packet is dropped so that the specific network device is prevented from accessing the network resource corresponding to the destination IP address.

The present disclosure has an effect of enabling a control of a zero trust network access in accordance with the zero trust security based on the network switch.

The present disclosure has another effect of enabling an application of a granular security policy by using the MAC/IP/VLAN information, etc., without installing an agent on a client terminal.

The present disclosure has still another effect of enabling an efficient segment-based resource access control by utilizing the ACL of the network switch.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for implementing a zero trust role-based microsegmentation, comprising steps of:

(a) in response to acquiring specific network device information for a specific network device from at least one access switch that enables network devices and network resources to communicate with one another within a network, wherein the specific network device accesses the network, registering, by a network controller, the specific network device in a specific segment among preset segments by referring to asset information corresponding to the specific network device, wherein the specific segment corresponds to the asset information, wherein the preset segments are acquired by microsegmenting the network based on a role which the network devices perform according to a network security policy for a zero trust security; and (b) transmitting, by the network controller, a specific segment identifier (ID) corresponding to the specific segment to the access switch, to thereby instruct the access switch to assign the specific segment ID as metadata to a specific Medium Access Controller (MAC) address of the specific network device by using VACL (Vlan Access Control List), and control an access of the specific network device to the network resources based on at least one specific resource access control rule corresponding to the specific segment ID by using IACL (Ingress Access Control list), wherein the specific network device is registered in the specific segment.

2. The method of claim 1, wherein, at the step of (a), the network controller identifies at least one matching keyword corresponding to preset segment keywords by referring to attribute values for each of categories registered in the asset information corresponding to the specific network device, identifies the specific segment corresponding to the at least one matching keyword, and registers the specific network device in the specific segment.

3. The method of claim 2, wherein, at the step of (a), in a state where at least one segment keyword is set for each of the preset segments by a network manager, the network controller identifies at least one matching keyword which is at least one specific attribute value corresponding to the segment keywords among the attribute values, identifies the specific segment for which the at least one matching keyword is set, and registers the specific network device in the specific segment.

4. The method of claim 1, wherein, before the step of (b), in a state where each of segment IDs corresponding to each of the preset segments is set to have at least one specific resource group accessible among resource groups, wherein the resource groups are classified by grouping based on roles of the network resources, the network controller registers an access right of each of the segment IDs for each of the network resources in the IACL by tagging each resource group to which each of the network resources belongs.

5. The method of claim 1, wherein, at the step of (b), the network controller instructs the access switch to identify the specific segment ID and a specific destination IP address of the specific packet transmitted from the specific network device, identify an access right of the specific segment ID for a specific network resource corresponding to the specific destination IP address through the IACL, and filter a transmission of the specific packet to the specific network resource according to the identified access right.

6. A method for implementing a zero trust role-based microsegmentation, comprising steps of:

(a) in response to detecting a connection of a specific network device to a network, transmitting, by at least one access switch that enables network devices and network resources to communicate with one another within the network, specific network device information for the specific network device to the network controller, to thereby instruct the network controller to register the specific network device in a specific segment among preset segments by referring to asset information corresponding to the specific network device and transmit a specific segment identifier (ID) corresponding to the specific segment to the access switch, wherein the specific network device is registered in the specific segment, wherein the specific segment corresponds to specific asset information, wherein the preset segments are acquired by microsegmenting the network based on roles performed by the network devices according to a network security policy for a zero trust security; and (b) in response to acquiring the specific segment ID corresponding to the specific network device from the network controller, assigning, by the access switch, the specific segment ID as metadata to a specific Medium Access Controller (MAC) address of the specific network device by using VACL (Vlan Access Control List), and controlling an access of the specific network device to the network resources based on at least one specific resource access control rule corresponding to the specific segment ID by using IACL (Ingress Access Control list).

7. The method of claim 6, wherein, at the step of (a), the access switch transmits the specific device information to the network controller, to thereby instruct the network controller to identify at least one matching keyword corresponding to preset segment keywords by referring to attribute values for each of categories registered in the asset information corresponding to the specific network device, identify the specific segment corresponding to the at least one matching keyword, and register the specific network device in the specific segment.

8. The method of claim 7, wherein, at the step of (a), in a state where at least one segment keyword is set for each of the preset segments by a network manager, the access switch instructs the network controller to identify at least one matching keyword which is at least one specific attribute value corresponding to the segment keywords among the attribute values, identify the specific segment in which the at least one matching keyword is set, and register the specific network device in the specific segment.

9. The method of claim 6, wherein, before the step of (b), in a state where each of segment IDs corresponding to each of the preset segments is set to have at least one specific resource group accessible among resource groups, wherein the resource groups are classified by grouping based on roles of the network resources, the access switch instructs the network controller to register an access right of each of the segment IDs for each of the network resources in the IACL by tagging each resource group to which each of the network resources belongs.

10. The method of claim 6, wherein, at the step of (b), the access switch identifies the specific segment ID and a specific destination IP address of a specific packet transmitted from the specific network device, identifies an access right of the specific segment ID for a specific network resource corresponding to the specific destination IP address through the IACL, and filters a transmission of the specific packet to the specific network resource according the identified access right.

11. A network controller for implementing a zero trust role-based microsegmentation, comprising:

at least one memory which saves instructions for implementing the zero trust role-based microsegmentation; and at least one processor configured to implement the zero trust role-based microsegmentation according to the instructions saved in the memory to perform processes of: (I) in response to acquiring specific network device information for a specific network device from at least one access switch that enables network devices and network resources to communicate with one another within a network, wherein the specific network device accesses the network, registering the specific network device in a specific segment among preset segments by referring to asset information corresponding to the specific network device, wherein the specific segment corresponds to the asset information, wherein the preset segments are acquired by microsegmenting the network based on a role which the network devices perform according to a network security policy for a zero trust security; and (II) transmitting a specific segment identifier (ID) corresponding to the specific segment to the access switch, to thereby instruct the access switch to assign the specific segment ID as metadata to a specific Medium Access Controller (MAC) address of the specific network device by using VACL (Vlan Access Control List), and control an access of the specific network device to the network resources based on at least one specific resource access control rule corresponding to the specific segment ID by using IACL (Ingress Access Control list), wherein the specific network device is registered in the specific segment.

12. The network controller of claim 11, wherein, at the process of (I), the processor identifies at least one matching keyword corresponding to preset segment keywords by referring to attribute values for each of categories registered in the asset information corresponding to the specific network device, identifies the specific segment corresponding to the at least one matching keyword, and registers the specific network device in the specific segment.

13. The network controller of claim 12, wherein, at the process of (I), in a state where at least one segment keyword is set for each of the preset segments by a network manager, the processor identifies at least one matching keyword which is at least one specific attribute value corresponding to the segment keywords among the attribute values, identifies the specific segment for which the at least one matching keyword is set, and registers the specific network device in the specific segment.

14. The network controller of claim 11, wherein, before the process of (II), in a state where each of segment IDs corresponding to each of the preset segments is set to have at least one specific resource group accessible among resource groups, wherein the resource groups are classified by grouping based on roles of the network resources, the processor registers an access right of each of the segment IDs for each of the network resources in the IACL by tagging each resource group to which each of the network resources belongs.

15. The network controller of claim 11, wherein, at the process of (II), the processor instructs the access switch to identify the specific segment ID and a specific destination IP address of the specific packet transmitted from the specific network device, identify an access right of the specific segment ID for a specific network resource corresponding to the specific destination IP address through the IACL, and filter a transmission of the specific packet to the specific network resource according to the identified access right.

16. An access switch for implementing a zero trust role-based microsegmentation, comprising:

at least one memory which saves instructions for implementing the zero trust role-based microsegmentation; and at least one processor configured to implement the zero trust role-based microsegmentation according to the instructions saved in the memory to perform processes of: (I) in response to detecting a connection of a specific network device to a network, transmitting specific network device information for the specific network device to the network controller, to thereby instruct the network controller to register the specific network device in a specific segment among preset segments by referring to asset information corresponding to the specific network device and transmit a specific segment identifier (ID) corresponding to the specific segment to the access switch, wherein the specific network device is registered in the specific segment, wherein the specific segment corresponds to specific asset information, wherein the preset segments are acquired by microsegmenting the network based on roles performed by network devices according to a network security policy for a zero trust security; and (II) in response to acquiring the specific segment ID corresponding to the specific network device from the network controller, assigning the specific segment ID as metadata to a specific Medium Access Controller (MAC) address of the specific network device by using VACL (Vlan Access Control List), and controlling an access of the specific network device to network resources based on at least one specific resource access control rule corresponding to the specific segment ID by using IACL (Ingress Access Control list).

17. The access switch of claim 16, wherein, at the process of (I), the processor transmits the specific device information to the network controller, to thereby instruct the network controller to identify at least one matching keyword corresponding to preset segment keywords by referring to attribute values for each of categories registered in the asset information corresponding to the specific network device, identify the specific segment corresponding to the at least one matching keyword, and register the specific network device in the specific segment.

18. The access switch of claim 17, wherein, at the process of (I), in a state where at least one segment keyword is set for each of the preset segments by a network manager, the processor instructs the network controller to identify at least one matching keyword which is at least one specific attribute value corresponding to the segment keywords among the attribute values, identify the specific segment in which the at least one matching keyword is set, and register the specific network device in the specific segment.

19. The access switch of claim 16, wherein, before the process of (II), in a state where each of segment IDs corresponding to each of the preset segments is set to have at least one specific resource group accessible among resource groups, wherein the resource groups are classified by grouping based on roles of the network resources, the processor instructs the network controller to register an access right of each of the segment IDs for each of the network resources in the IACL by tagging each resource group to which each of the network resources belongs.

20. The access switch of claim 16, wherein, at the process of (II), the processor identifies the specific segment ID and a specific destination IP address of a specific packet transmitted from the specific network device, identifies an access right of the specific segment ID for a specific network resource corresponding to the specific destination IP address through the IACL, and filters a transmission of the specific packet to the specific network resource according the identified access right.

* * * * *